United States Patent [19]

Kanamaru

[11] Patent Number: 4,998,575

[45] Date of Patent: Mar. 12, 1991

[54] HEAVY LOADING TUBLESS TIRE WITH DEFINED POLYGONAL SECTION BEAD CORE

[75] Inventor: Masahiko Kanamaru, Zushi, Japan

[73] Assignee: The Yokohama Rubber Co., Ltd., Tokyo, Japan

[21] Appl. No.: 382,449

[22] Filed: Jul. 20, 1989

[30] Foreign Application Priority Data

Jul. 28, 1988 [JP] Japan ................ 63-186744

[51] Int. Cl.$^5$ .............................. B60C 15/04
[52] U.S. Cl. .................. 152/540; 152/544
[58] Field of Search ............ 152/540, 544; 245/1.5

[56] References Cited

U.S. PATENT DOCUMENTS

| 3,612,139 | 10/1971 | Marzocchi | 152/540 |
| 4,192,368 | 3/1980 | Maiocchi | 152/540 |

FOREIGN PATENT DOCUMENTS

| 2044995 | 3/1972 | Fed. Rep. of Germany | 152/540 |
| 179309 | 9/1985 | Japan | 152/540 |
| 62-9442 | 2/1987 | Japan | |
| 215607 | 8/1989 | Japan | 245/1.5 |

Primary Examiner—John J. Gallagher
Assistant Examiner—Geoffrey L. Knable
Attorney, Agent, or Firm—Armstrong, Nikaido, Marmelstein, Kubovcik, & Murray

[57] ABSTRACT

A heavy loading tubless tire comprising a bead portion which has a buried bead core bundled of a plurality of bead wires and having a polygonal section contour and which has its bead base composed of two regions: a region $W_1$ located at the side of the bead heel and inclined at an angle substantially equal to the angle $\theta$ of inclination of a rim base with resepct to the axis of tire rotations; and a region $W_2$ located at the side of the bead toe and inclined at a larger angle than the angle $\theta$ of inclination of said rim base, wherein the improvement resides: in that the width of the region $W_2$ at the side of said bead toe measured in the axial direction of tire rotations is within a range of 30 to 70% of the total width of the bead base measured in the axial direction of tire rotations whereas the width of said bead core measured in the axial direction of tire rotations is at least 40% as large as the total width of said bead base; and in that the bottom side of the polygonal contour of said bead core at the side of the bead base is composed of a bottom side $a_1$, which is located at the side of the bead heel and inclined at an angle $\theta a$ substantially equal to the inclination angle $\theta$ of said rim base, a bottom side $a_2$, which is located to merge into said bottom side $a_1$ and inclined at an angle $\theta b$ larger than the inclination angle $\theta$ of said rim base, and a bottom side $a_3$ which is so located at the side of the bead toe as to project from the extension of said bottom side $a_1$ toward said bead base.

4 Claims, 8 Drawing Sheets

HEAVY LOADING TUBELESS TIRE WITH DEFINED POLYGONAL SECTION BEAD CORE

BACKGROUND OF THE INVENTION

The present invention relates to a heavy loading tubeless tire and, more particularly, to a heavy loading tubeless radial tire having a bead structure which allows less deformation even after a long use.

In the prior art, the heavy loading tubeless tire to be used in trucks or buses is constructed, as shown in FIG. 3, of a bead portion including: a carcass ply 2 wound around a bead core 1 from the inside to the outside of the tire; a reinforcing layer 3 arranged along the carcass ply 2; a reinforcing layer 6 covering the terminals of the carcass ply 2 and the reinforcing layer 3; bead fillers 4 and 5 filling up the upper portion of the bead core 1; and a rubber layer enveloping the foregoing components altogether. Generally speaking, the base 9 of the bead portion is composed of a region $W_1$, which is located at the side of a bead heel 8 and inclined at such an angle $\theta_1$ of inclination with respect to the axis of tire rotations as is substantially equal to that of the (not-shown) rim base of the tire rim, and a region $W_2$ which is located at the side of a bead toe 7 and inclined at such an angle $\theta_2$ as is larger by 3 to 15 degrees than that of the rim base. In order to hold the gas-tightness, the heavy loading tubeless tire is fitted for use on the rim having its base inclined usually at about 15 degrees with respect to the axis of tire rotations and has the bead portion desired to have an internal diameter smaller than the diameter of the rim. In order to facilitate the inflation, when the rim is to be assembled, and to enhance the gas-tightness, the heavy loading tubeless tire is formed with the aforementioned region $W_2$ which is inclined at an angle larger by 3 to 15 degrees than that of the bead base 9.

In the case of the heavy loading tubeless tire, i.e., the radial tire in which the carcass chords are arranged substantially in the normal direction of the annular bead core, the force to be exerted upon the carcass chords while the tire is being inflated or rolling under load is transmitted directly to the bead core so that a remarkably strong force is applied in the normal direction of the bead core. In case the tire of the prior art having the aforementioned bead structure is fitted on the rim, the tire components positioned below the bead core 1 are compressed by the bead structure so that the force to the compression is exerted upon the bead core 1. As shown in FIG. 6, however, the force distributed in the widthwise direction of the bead core 1 (i.e., in the direction of tire rotations) is not uniform, as indicated by arrows, such that the force is stronger in the region $W_2$ than in the region $W_1$. As shown in FIG. 7, moreover, the force, which are generated in the direction of arrows by the tension (as indicated by broken arrows) acting upon the carcass chords 2, are exerted upon the bead core 1 to float the toe of the bead core 1 together with the aforementioned force to the compression.

Since this fact is not known yet, the heavy loading tubeless tire of the prior art is constructed by laminating a plurality of bead wires 11 to make a hexagonal bead core 1 so that the widthwise strength of the bead core 1 may not be different between the sides of the bead toe 7 and the bead heel 8. However, this tire is short of strength at the side of the bead toe 7 of the bead core 1 so that the bead core 1 itself cannot be prevented from being bent and deformed radially outward at the side of the bead toe 7. In other words, the bead core 1 having a section as indicated by the solid lines in FIG. 8 tends to be deformed to have a section as indicated by broken lines. Moreover, the rubber at the bead toe is repeatedly compressed and deformed by the bending deformations of the bead core rolling under load and is degraded as a result of the temperature rises of the internal air and the rim of the tire in accordance with the run of the vehicle. Thus, the deformations are frequently so permanent that they cannot be remedied. Since, moreover, the strength of the bead toe 7 of the bead core is not sufficient, as has been described hereinbefore, the portion of the bead core at the side of the bead to 7 is deformed by the force coming from the rim and exerted upon the bead core and the carcass tension. This deformation reduces the area of the bead base 9 to come into contact with the rim base 9 thereby augment the contact pressure of the bead base 9 per unit width. As a result, at the initial stage, the deformation of the bead portion is caused at a remarkably narrow region at the leading end of the bead toe, as shown in FIG. 9. This deformation progresses from the shape of FIG. 9 through the shape of FIG. 10 to the shape of FIG. 11 and extends from the bead toe to the bead heel. Moreover, the widthwise deformation T and the radial deformation S of the bead toe are gradually augmented. As shown in FIG. 11, a floating deformation of a distance u is also caused at the bead toe of the bead core 1. Incidentally, broken lines of FIGS. 9 to 11 designate the bead toe of a new tire.

As a result of the aforementioned deformations of the bead core and toe, the area of the bead base to contact with the rim base is reduced to float the bead toe thereby to drop the gas-tightness of the tire, and the tire becomes difficult to inflate when the rim is assembled Moreover, the region $W_2$ of the new tire having a higher gradient than the rim base to increase the diameter of the leading end of the bead base substantially. On the other hand, the deformations of this kind are caused neither simultaneously nor equally along the bead base in the circumferential direction of the tire so that the bead base is not evenly fitted on the rim base, thus raising a major cause for generating oscillations during the run of the vehicle.

If, moreover, the contact area of the bead base and the rim base is reduced by the bending deformations of the bead core, the carcass chords fixed firmly below the bead core become loose to increase the motions of the turned-up terminal portion of the carcass layer. Thus, there arises a serious defect that the turned-up terminal portion of the carcass layer are liable to separate.

These problems caused by the structures of the bead portion and the bead core are serious ones to be solved in the heavy loading tubeless tire which is renewed for use with a view to elongating the lifetime.

Japanese patent application Kokai publication No. 61-295107 has proposed a tire in which the bead wires in the bead core are made to have different diameters in the radially inner and outer sides so as to equalize the stresses of the individual layers in the bead core. However, this proposal has neither noted the fact that the aforementioned stress distribution in the bead core is remarkably uneven not in the vertical direction but in the widthwise direction nor solved the aforementioned problems.

On the other hand, Japanese patent publication No. 62-9442 has proposed a tire which has its bead toe prevented from being deformed by regulating the positional relations at the bead base of the bead core having a hexagonal section. However, this proposal has not noted the shape of the bead base and the strength of the region $W_2$, which are fundamental causes for deforming the bead toe of the heavy loading tubeless tire.

There is known a tire which has a bead core 1 prepared by bundling a plurality of bead wires 11 having square sections in a generally rectangular form, as shown in FIG. 5. This tire has a slightly higher strength at the side of the bead toe of the bead core than the aforementioned tire having the bead core of generally hexagonal sections, but the strength per se is not sufficient for preventing the deformation of the bead toe so that the troubles similar to those of the aforementioned heavy loading tubeless tire are caused if the use period of the tire is long.

There is another tire which has its bead core enlarged by increasing the number of bead wires relatively while holding the shape of the bead core having a generally hexagonal section. Since this tire has a large extension in its bead core toward the bead toe, it is not expectable to improve the strength of the bead core at the side of the bead toe. Since, moreover, the weight of the bead core is remarkably increased, the effect of preventing the deformation of the bead toe is slight.

SUMMARY OF THE INVENTION

An object of the present invention is to provide a heavy loading tubeless tire which is enabled to suppress the bending deformation of a bead core, while the tire is rolling under load, by improving the strength of the side of the bead toe in the bead core and to improve the durability of the bead portion by preventing the deformation of the bead toe following the deformation of the bead core. Another object of the present invention is to provide a heavy loading tubeless tire which has its air inflatability and gas-tightness improved together with the separation resistance of the turned-up terminal portion of the carcass layer without deteriorating the fittedness of the tire on the rim.

In order to achieve these objects, according to the present invention, there is provided a heavy loading tubeless tire comprising a bead portion which has a buried bead core bundled of a plurality of bead wires and having a polygonal section contour and which has its bead base composed of two regions: a region $W_1$ located at the side of the bead heel and inclined at an angle substantially equal to the angle $\theta$ of inclination of a rim base with respect to the axis of tire rotations; and a region $W_2$ located at the side of the bead toe and inclined at a larger angle than the angle $\theta$ of inclination of said rim base, wherein the improvement resides: in that the width of the region $W_2$ at the side of said bead toe measured in the axial direction of tire rotations is within a range of 30 to 70% of the total width of the bead base measured in the axial direction of tire rotations whereas the width of said bead core measured in the axial direction of tire rotations is at least 40% as large as the total width of said bead base; and in that the bottom side of the polygonal contour of said bead core at the side of the bead base is composed of a bottom side $a_1$, which is located at the side of the bead heel and inclined at an angle $\theta a$ substantially equal to the inclination angle $\theta$ of said rim base, a bottom side $a_2$, which is located to merge into said bottom side $a_1$ and inclined at an angle $\theta b$ larger than the inclination angle $\theta$ of said rim base, and a bottom side $a_3$ which is so located at the side of the bead toe as to project from the extension of said bottom side $a_1$ toward said bead base.

BRIEF DESCRIPTION OF THE INVENTION

DETAILED DESCRIPTION OF THE INVENTION

Figure 1:
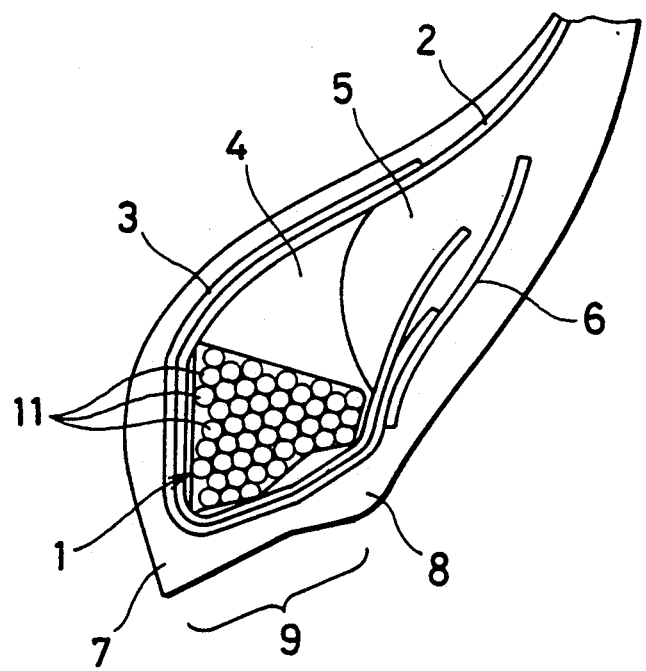
FIG. 1 is a section showing one example of the structure of the bead portion of a tire according to the present invention.

As shown in FIG. 1, the tire of the present invention is composed of: a bead core 1 having a polygonal section; two carcass plies 2 turned up around the bead core 1 from the inside to the outside of the tire; a reinforcing layers 3 and 6 covering the turned-up terminal portion of the carcass plies 2; and bead fillers 4 and 5 wrapped in the carcass ply 2 above the bead core 1. These components are wrapped together in a rubber layer, which is molded below the bead core 1 into a bead base 9 to be fitted on a rim 12. Reference numeral 7 designates a bed toe forming the inner leading end of the bead base 9, and numeral 8 designates a bead heel forming the outer trailing end.

The bead base 9 of the bead portion of the tire of the present invention is composed of the aforementioned two regions $W_1$ and $W_2$ which have different inclination angles with respect to the axis of tire rotations. The region $W_1$ is inclined at an angle substantially equal to the inclination angle $\theta$ of the aforementioned rim base, and the region $W_2$ is inclined at an angle larger than the inclination angle $\theta$ of the rim base.

In order to allow the heavy loading tubeless tire to exhibit its intrinsic performance, the region $W_2$ constituting the bead base 9 is within a range of 30 to 70% of the total width ($W_1 + W_2$) of the bead base 9. In order to retain the contactness between the rim base and the bead base 9, moreover, the width of the bead core 1 is made to occupy at least 40% of the width of the bead base 9.

Here, the widths of the bead base 9, the region $W_2$ and the bead core 1 are the distances taken on a straight line, which is in parallel with the axis of tire rotations, between the terminals at the sides of the bead toe and heel, in case the terminals of the bead base 9, the region $W_2$ and the bead core 1 at the sides of the bead toe and heel are projected at a right angle on that straight line.

The relations of the widths of the aforementioned region $W_2$ and the bead core to the whole width of the bead base are apparent from the experimental results, as will be described in the following.

Figure 12:
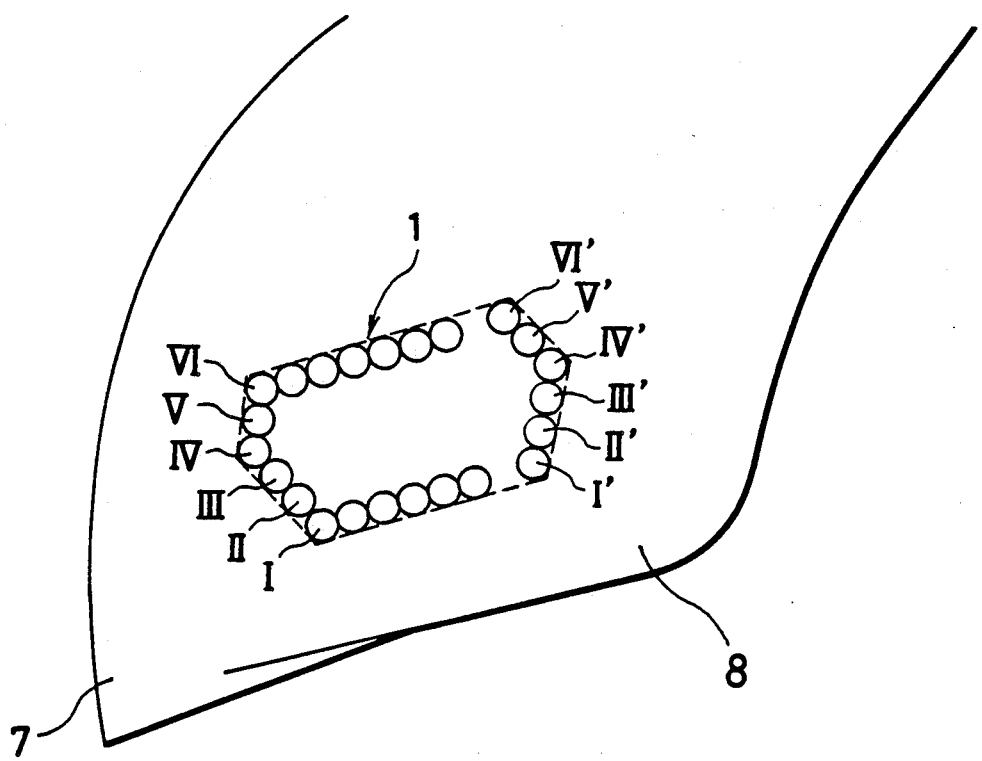
FIG. 12 is a diagram for explaining the arrayed positions of the individual bead wires composing the bead core.
Figure 13:
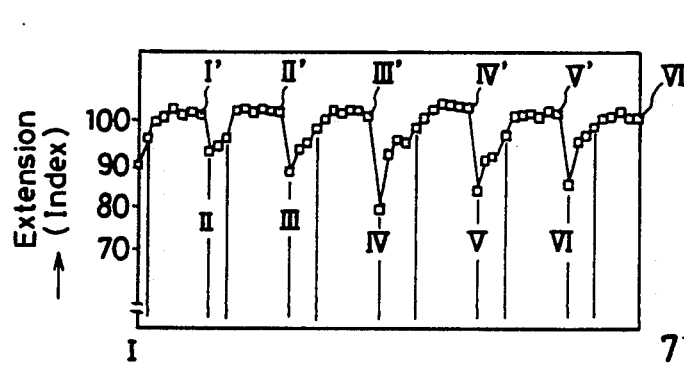
FIGS. 13B, 14B and 15B are sections showing the bead portions of the tires of the prior art.
FIGS. 13A, 14A and 15A are graphs plotting the extension distributions of the bead wires at the individual positions set in FIG. 12 after the run of a predetermined distance of the tires of the prior art having the bead portions shown in FIGS. 13B, 14B and 15B, respectively.
Figure 13:
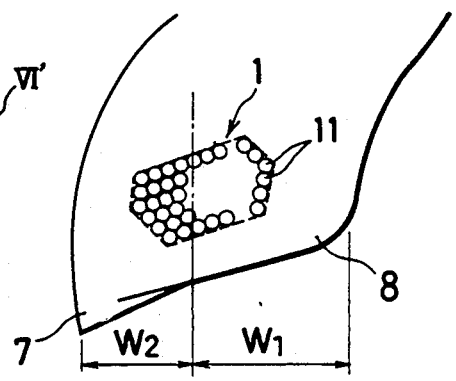
Figure 14:
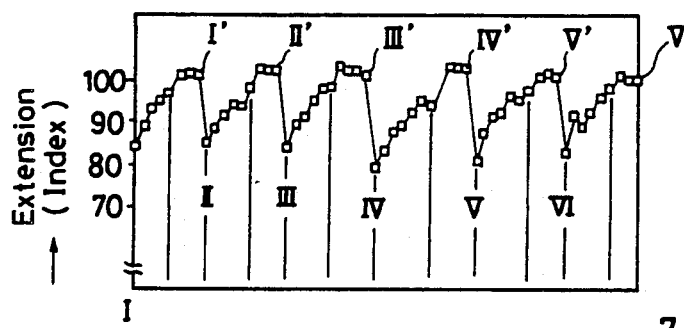
Figure 14:
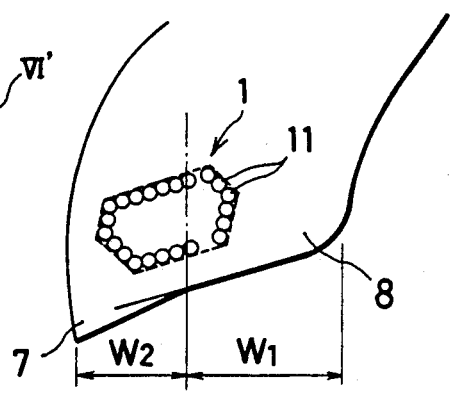
Figure 15:
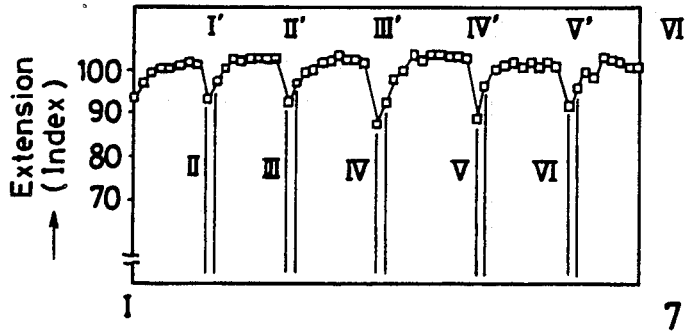
Figure 15:
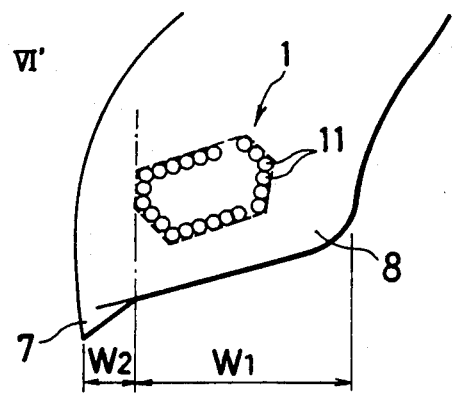

FIG. 12 shows the tire having the bead core 1 of a hexagonal section, in which bead wire groups were laminated in the order of I—I', II—II', III—III', IV—IV', V—V' and VI—VI'. The tires of three kinds, in which the arrangement and the ratio of the aforementioned regions $W_1$ and $W_2$ of the bead portion of the bead core were changed, as shown in FIGS. 13B, 14B and 15B, were run a predetermined distance. The extensions (indicated by index) of the individual bead wires 11 composing the bead core had the distributions, as shown in FIGS. 13A, 14A and 15A. From these graphs, the following items (1) to (3) are found:

(1) In the case of a tire as shown in FIG. 13B having such bead structure in which the bead core 1 is positioned generally at the widthwise center of the bead portion and in which the proportion of the region $W_2$ to the region $W_1$ is relatively large, while wires in the region $W_2$ undergo a large extent of lowering of an original normal extension property before the tire is put to service, wires in the region $W_1$ undergo almost no lowering.

(2) In the case of the tire of FIG. 14B, in which the bead core 1 is shifted toward the bead toe with the regions $W_1$ and $W_2$ being similar to those of FIG. 13B, as shown in FIG. 14A, most of the bead wires exhibit a large extent of lowering of the extensions, and only a few bead wires undergoing no change are located at the side of the bead heel.

(3) In the case of the tire of FIG. 15B, in which the bead core 1 is arranged generally in the same position as that of the bead core of FIG. 13B but in which the region $W_2$ at the side of the bead toe is extremely narrowed, only a few bead wires positioned at the side of the bead toe exhibit the lowering of the extensions, and the lowering of the extensions is very small. In the case of the tire of FIG. 15B, however, the diameter of the bead toe cannot be made far smaller than that of the rim base, the inflatability for the rim assemblage and the gas-tightness between the rim base and the bead base are seriously deteriorated even for a new tire. If, moreover, the region $W_2$ having a larger inclination than that of the rim base is less than 20% of the whole width of the bead base, as shown in FIG. 15B, the compression to be exerted upon the rubber of the region $W_2$ is far higher than that of the remaining portions to degrade the rubber abruptly and impractically. In the present invention, therefore, the width of the region $W_2$ measured in the axial direction of tire rotations is 30 to 70% as large as the total width of the bead base measured in the axial direction of tire rotations, and the width of the bead core measured in the axial direction of tire rotations is at least 40% as large as the total width of the bead base, as has been described hereinbefore.

In the present invention, on the other hand, the sectional shape of the bead core is defined as a polygonal shape which is formed of a contour composed of straight lines joining the outermost wires belonging to the plural bead wire groups.

Figure 2:
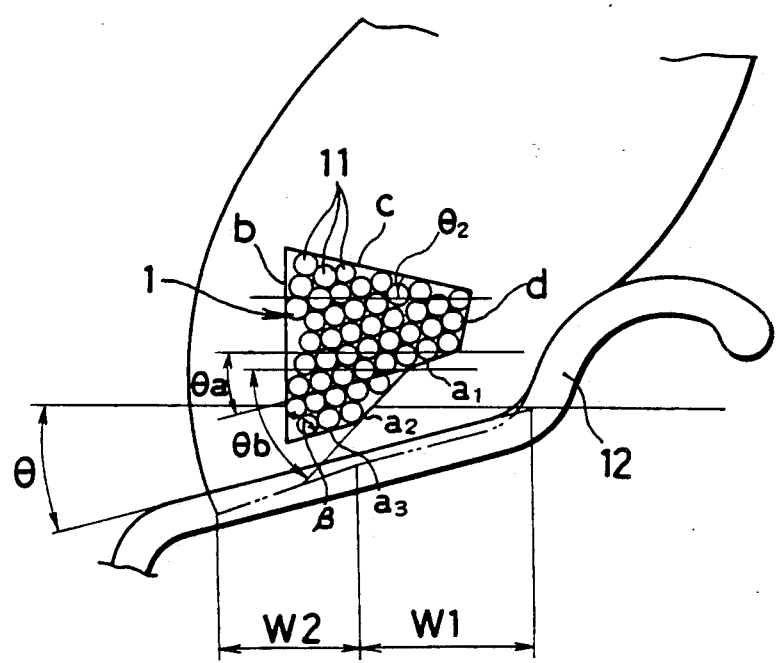
FIG. 2 is an enlarged diagram showing the bead core of FIG. 1.
Figure 3:
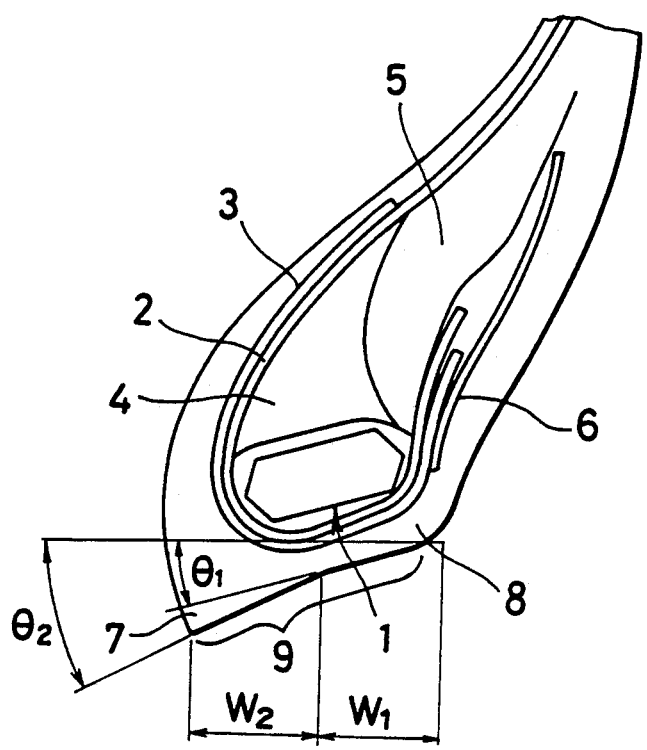
FIG. 3 is a section showing one example of the structure of the bead portion of the tire of the prior art.
Figure 4:
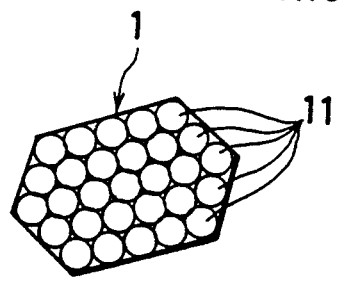
FIGS. 4 and 5 are enlarged diagrams showing the bead core of FIG. 3.
Figure 5:
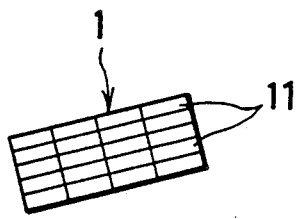
Figure 6:
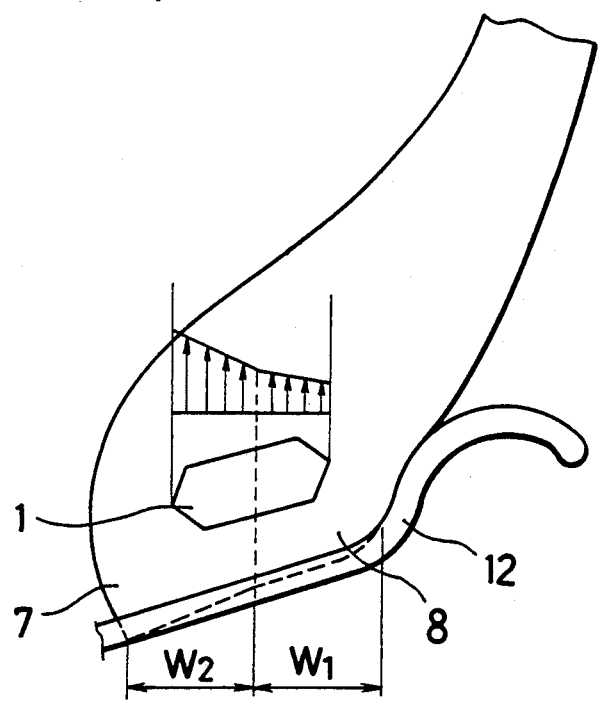
FIG. 6 is a explanatory diagram showing the distribution of the force which is to be received by the bead core of the tire of the prior art from the rim.
Figure 7:
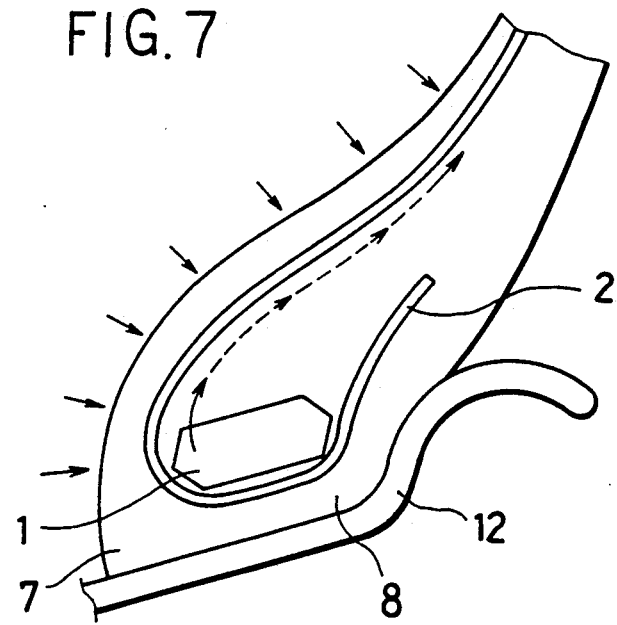
FIG. 7 is an explanatory diagram showing the operating state of the force which is to be received by the bead core of the tire of the prior art from the carcass chords.
Figure 8:
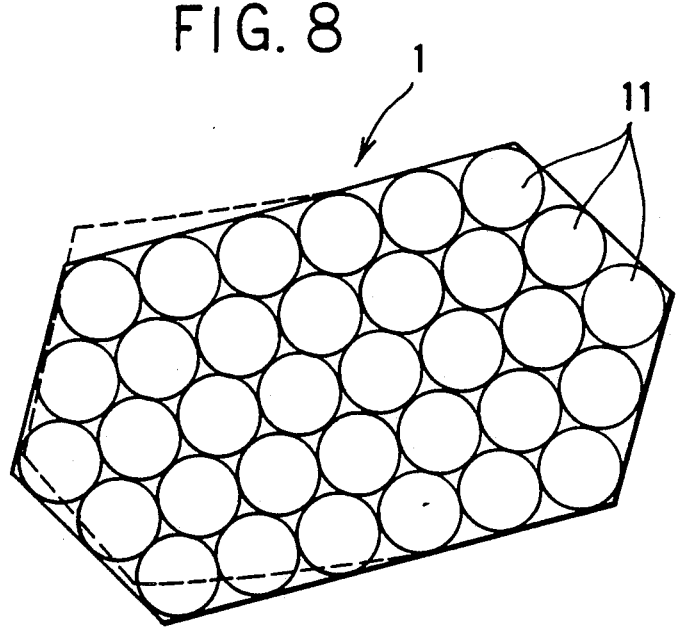
FIG. 8 is a diagram showing the deformed state of the bead core in the tire of the prior art.

As shown in FIG. 2, the contour of the bead core 1 of the tire according to the present invention has a polygonal section contour. The bead core 1 shown in FIG. 2 has a hexagonal section which is defined by: bead base bottom sides $a_1$, $a_2$ and $a_3$; an inner side b extending radially outward of the tire from the inner end of the bottom side $a_3$; an upper side c merging into the inner side b; and an outer side d joining the outer ends of the upper side c and the bottom side $a_1$.

In the bead core 1 having such sectional shape, of the three bottom sides forming the bead base bottom: the bottom side $a_1$ located at the side of the bead heel has such an angle $\theta_a$ of inclination as is substantially equal to the inclination angle $\theta$ of the rim base 12 with respect to the axis of tire rotations; the bottom side $a_2$ has an inclination angle $\theta_b$ larger than the inclination angle $\theta$ of the rim base 12; and bottom side $a_3$ at the side of the bead toe has an inclination angle equal to or near the inclination angle $\theta_a$ of the bottom side $a_1$. The tire having such section according to the present invention has its bead core 1 strengthened at the side of the bead toe by forming a convex bead wire group which is defined by the bottom side $a_2$ inclined at the angle $\theta_b$ downward of the extension of the bottom side $a_1$ of the bead heel side inwardly of the tire, the bottom side $a_3$ and the inner side b. In order to reduce the drop of the strength of the bead core 1 at the side of the bead toe after a long use, moreover, the intersection between the bottom sides $a_1$ and $a_2$ of the bead core is positioned in the aforementioned region $W_1$ at the side of the bead heel.

Moreover, the angle $\beta$ contained by the bottom side $a_3$ and the inner side b of the bead core 1 is desired to be within a range of 70 to 100 degrees. For the angle $\beta$ smaller than 70 degrees, the angle of intersection between the bottom side $a_3$ and the inner side b becomes so acute that the carcass chords 2 and the bead core 1 may possibly come into contact, while the tire is being produced or run under load, to damage the carcass chords 2 thereby to shorten the lifetime of the tire. For the angle $\beta$ larger than 100 degrees, on the other hand, the extensions of bead wires 11 over the bead toe of the bead core 1 become large enough to drop the properties of the bead wires 11.

The bottom side $a_3$ of the bead core 1 is preferred to have an angle substantially equal to that of the bottom side $a_1$ so as to facilitate the productions of the fitting faces of a rim base 12 and the tire bead base 9 and the bead core 1 itself.

In order to improve the strength of the bead core at the side of the bead toe, moreover, the angle $\theta_2$ of the upper side c with respect to the axis of tire rotations is desired to be smaller than or opposite to the inclination angle $\theta_a$ of the bottom side $a_1$.

Here, the outer side d joining the upper side c and the bottom side $a_1$ is not especially limited.

Incidentally, the foregoing embodiment has been described in case the inner side b is straight, but this side b may be a curb such as an arc bulging gently inward of the tire. In this arc case, the carcass plies 2 and the bead core 1 can be easily held in contact when the carcass plies 2 are folded up around the bead core 1 from the inside to the outside during the production of the tire.

Figure 20:
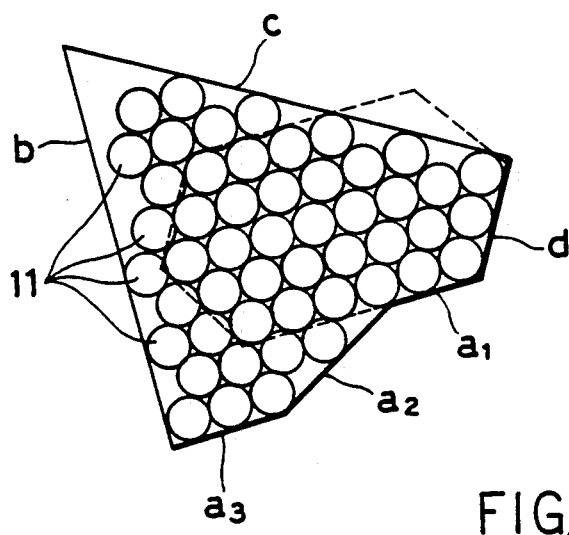
FIGS. 20A to 20E are sections showing other examples of the bead core structure of the tire of the present invention.
Figure 20:
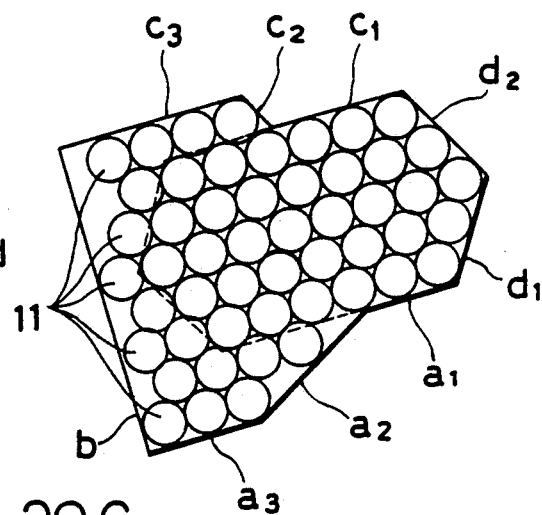
Figure 20:
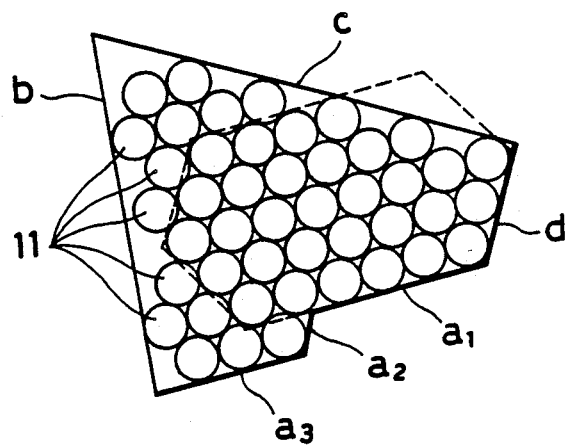
Figure 20:
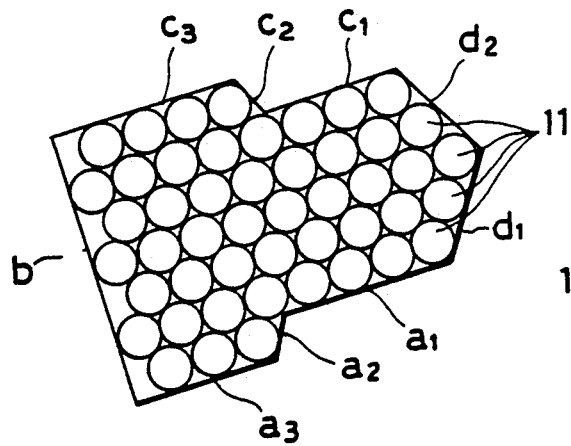
Figure 20:
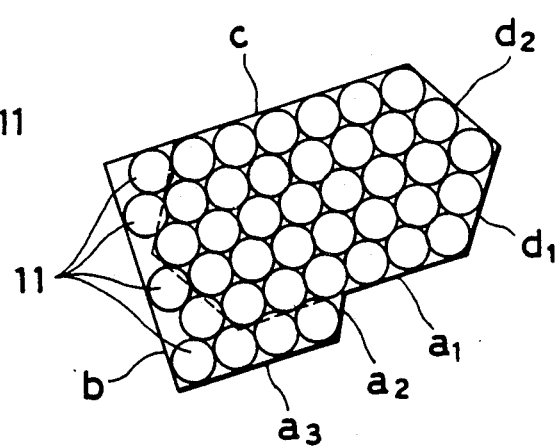

The section of the bead core of the tire according to the present invention may take the shapes, as shown in FIGS. 20A to 20E. FIG. 20A shows an example, in which the angle $\theta_b$ and the length of the bottom side $a_2$ are equal to but the angles $\beta$ and $\theta_2$ are larger than those of the sectional shape of the bead core shown in FIG. 2. FIG. 20C shows an example, in which the bottom side $a_1$ is longer but the bottom side $a_2$ is shorter than those of FIG. 20A. On the other hand, FIG. 20B provides a structure in which the upper side is composed of three segments $c_1$, $c_2$ and $c_3$ and in which the side d is composed of two segments $d_1$ and $d_2$. FIG. 20D shows an example in which the three segments $c_1$, $c_2$ and $c_3$ of the upper side c are arranged generally symmetrically with the bottom sides $a_1$, $a_2$ and $a_3$. FIG. 20E shows an example in which the upper side segments of FIG. 20D are united into one upper side c.

The tire having the bead core of the aforementioned section according to the present invention can prevent its bead core from floating at the side of the bead toe and can suppress the bending deformations drastically. This makes it possible to maintain the contacting condition between the whole bead base of the tire and the rim base continuously thereby to prevent the deformation of the bead toe effectively.

Here, the section of the bead wires constructing the bead core of the tire of the present invention should not be limited to the circular section but can be exemplified by square or other sections. The present invention can be most suitably applied to the heavy loading radial tire.

The operations and effects of the tire according to the present invention will be described in the following in connection with the specific embodiments.

The tire of the present invention was produced to have the bead portion of the structure shown in FIG. 1. For comparisons, the tire of the present invention was modified into four kinds of comparison tires I, II, III and IV having different sectional shapes of the bead portion and different ratios of the regions $W_1$ and $W_2$, as shown in FIGS. 16, 17, 18 and 19.

All of these tires had the size of 11R11 5 14PR.

These five kinds of tires were fixed on a vehicle, e.g., a truck of 2·D·D type of 10 tons. This truck was run 180,000 Km with the tires under an air pressure of 7.00 Kgf/cm² and under a load of 2,500 Kg per tire.

Figures 9, 10:
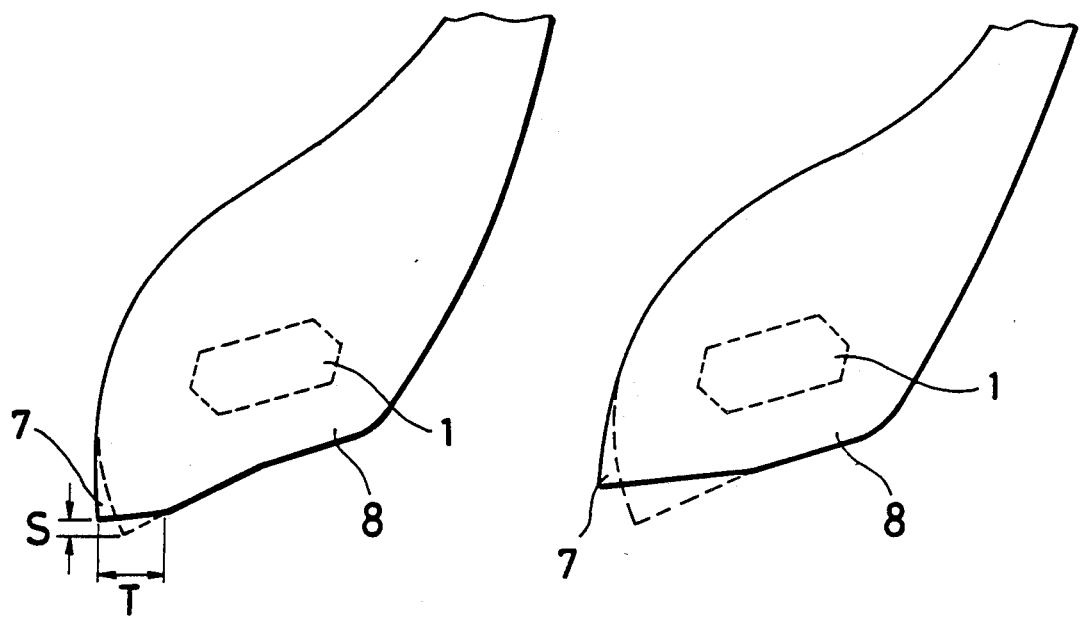
FIGS. 9 to 11 are diagrams showing the individual states in which the deformations of the bead toe of the tire of the prior art are expanded from their initial state
Figure 11:
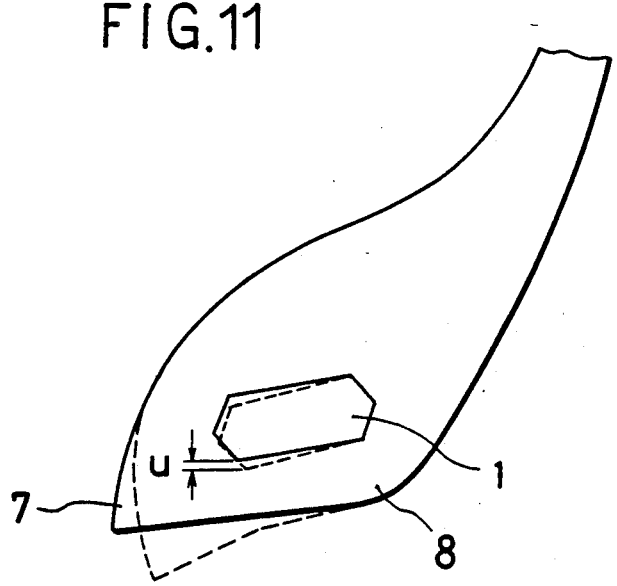

After this running test, the shapes of the bead toes of the individual tire removed from the vehicle were compared with those of the new tires, and the deformations S and T of the bead toe were measured, as has been described with reference to FIG. 9.

As to the inflatability for the tire to be fitted on the rim, the tire was once removed from the rim and then fitted on the rim, and the inflatability was evaluated.

For these evaluations, the case, in which one operator could inflate the tire by his ordinary operations, is indicated by "o", and the case, in which the operator could not inflate the tire before he used a sealing jig for the tire bead portion, is indicated by "X".

In these evaluations, moreover, one operator fitted the several tires of the same structure and mileage on the rim. The tires having their evaluations divided into "o" and "X" are indicated by "Δ".

The fittedness between the rim and the tire was evaluated by measuring the ga between the rim flange and the tire rim check line all over the circumference of the tire, when the tire is inflated with the maximum air pressure of JATMA, and its fluctuations were indicated.

After the evaluations described above, the run tires were cut to examine whether or not the turned-up terminal portion of the carcass plies were separated. If any, the maximum crack length of the separated tire was measured.

In the following Table, letters T and S indicate the deformations in the widthwise and radial directions of the tire, respectively.

Figure 16:
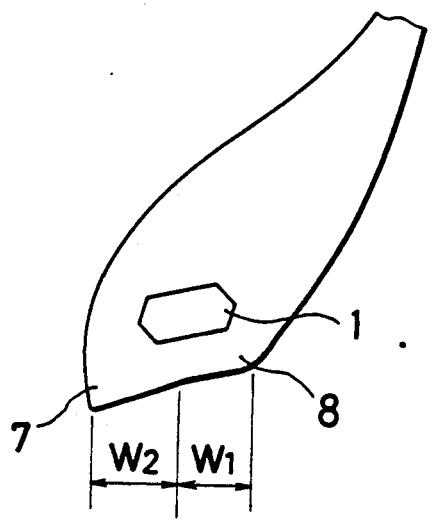
FIGS. 16, 17, 18 and 19 are sections showing the structures of the bead portions of the tires in which the bead cores have their sections and positional relationships changed.
Figure 17:
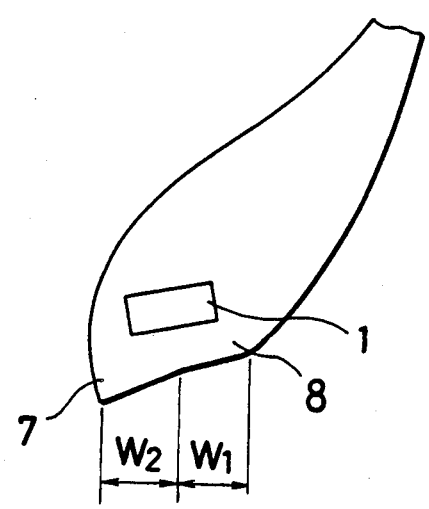
Figure 18:
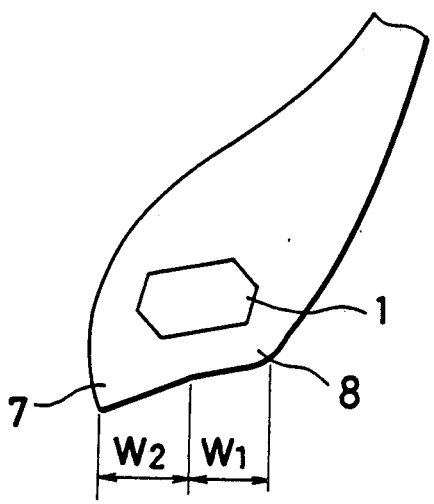
Figure 19:
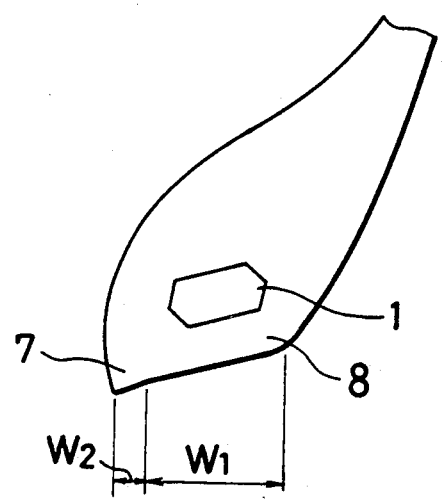

|  | Tire I | Tire II | Tire III | Tire IV | Tire Inv. |
|---|---|---|---|---|---|
| Bead Core | FIG. 16 | FIG. 17 | FIG. 18 | FIG. 19 | FIG. 1 |
| Deformations S of Bead Toe | 6.9 mm | 4.6 mm | 6.0 mm | 6.7 mm | 1.1 mm |
| T | 12.1 mm | 8.7 mm | 8.2 mm | 7.3 mm | 2.9 mm |
| Inflatability | X | Δ | X | X | o |
| Rim Fittedness | 2.4 mm | 1.6 mm | 1.4 mm | 1.6 mm | 0.4 mm |
| Separation* | 4 | 2 | 3 | 4 | 0 |

Separation*: taken at the turned-up terminal portion of the carcass plies.

It is found from this Table that the tire of the present invention has less deformations of the bead toe than the comparison tires I to IV so that the bead core is strengthened at the bead toe side. Since this improvement in the strength prevents the deformation of the bead toe, it is possible to improve the inflatability for the rim assemblage and the fittedness with the rim for the rim re-assemblage. No separation occurs in the turned-up terminal portion of the carcass.

What is claimed is:

1. A heavy loading tubeless tire of the type including a bead portion to be fitted on an inclined base of a wheel rim, comprising: a bead portion which has a buried bead core bundled of a plurality of bead wires and having a polygonal section contour and which has a bead base composed of two regions: a region $W_1$ located at the side of a bead heel and inclined at an angle substantially equal to an angle $\theta$ of inclination of the wheel rim base with respect to the axis of tire rotations; and a region $W_2$ located at the side of a bead toe and inclined at a larger angle than said angle of inclination of the wheel rim base with respect to the axis of tire rotations, wherein the improvement resides: in that the width of the region $W_2$ at the side of said bead toe measured in the axial direction of tire rotations is within a range of 30 to 70% of the total width of the bead base measured in the axial direction of tire rotations whereas the width of said bead core measured in the axial direction of tire rotations is at least 40% as large as the total width of said bead base; and in that the polygonal contour of said bead core is composed of a bottom side $a_1$, which is located at the side of the bead heel and inclined at an angle $\theta a$ substantially equal to the inclination angle of the bead base in said region $W_1$ relative to the axis of tire rotations, a bottom side $a_2$, which is located to merge into said bottom side $a_1$ and inclined at an angle $\theta b$ larger than the inclination angle of the bead base in said region $W_1$ relative to the axis of tire rotations, a bottom side $a_3$, which is located at the side of the bead toe and inclined at an angle substantially equal to the angle of inclination of said bottom side $a_1$ and which merges into said bottom side $a_2$ such that a convex portion of the bead core, defined by said bottom sides $a_2$ and $a_3$ and a radially inner portion of an inner side b extending radially outward of the tire from the end portion of said bottom side $a_3$ at the side of the bead toe, projects inward toward said bead base from an axially inward extension of said bottom side $a_1$, and an upper side c opposed to said bottom side $a_1$, said upper side c being disposed at an angle of inclination ($\theta_2$) with respect to the axis of tire rotations that is of an inclination that is smaller than and opposite to the angle of inclination ($\theta_2$) of said bottom side $a_1$ relative to the axis of tire rotations.

2. A heavy loading tubeless tire as set forth in claim 1, wherein an angle $\beta$ contained between said bottom side $a_3$ and said inner side b is 70 to 100 degrees.

3. A heavy loading tubeless tire as set forth in claim 1, which also includes at least one carcass ply having cords arranged substantially in the normal direction of a buried annular bead core.

4. A heavy loading tubeless tire as set forth in claim 1, wherein said bottom side $a_2$ intersects said bottom side $a_1$ in the region $W_1$.

* * * * *